(12) United States Patent
Nickel

(10) Patent No.: US 10,016,828 B2
(45) Date of Patent: Jul. 10, 2018

(54) CUTTING INSERT AND MILLING TOOL

(71) Applicant: SANDVIK INTELLECTUAL PROPERTY AB, Sandviken (SE)

(72) Inventor: Sandro Nickel, Brotterode (DE)

(73) Assignee: SANDVIK INTELLECTUAL PROPERTY AB, Sandviken (SE)

(*) Notice: Subject to any disclaimer, the term of this patent is extended or adjusted under 35 U.S.C. 154(b) by 190 days.

(21) Appl. No.: 14/845,318

(22) Filed: Sep. 4, 2015

(65) Prior Publication Data

US 2016/0067805 A1 Mar. 10, 2016

(30) Foreign Application Priority Data

Sep. 5, 2014 (EP) ..................................... 14183763

(51) Int. Cl.
*B23C 5/20* (2006.01)
*B23F 21/14* (2006.01)
*B23F 21/16* (2006.01)
*B23C 5/22* (2006.01)

(52) U.S. Cl.
CPC ............ *B23F 21/166* (2013.01); *B23C 5/207* (2013.01); *B23C 5/2273* (2013.01); *B23F 21/146* (2013.01); *B23C 5/202* (2013.01); *B23C 2200/161* (2013.01); *B23C 2200/165* (2013.01); *B23C 2210/168* (2013.01)

(58) Field of Classification Search
CPC ....... B23C 5/08; B23C 5/2221; B23C 5/2247; B23C 5/2234; B23C 5/207; B23C 5/2273; B23C 5/202; B23C 2200/165; B23C 2200/161; B23C 2210/244; B23F 21/146; B23F 21/143; B23F 21/166; B23F 21/163; B23F 21/128
See application file for complete search history.

(56) References Cited

U.S. PATENT DOCUMENTS

| 5,931,613 | A | * | 8/1999 | Larsson | ................. B23B 27/08 407/103 |
| 9,283,631 | B2 | * | 3/2016 | Sjoo | ...................... B23F 21/166 |
| 2006/0216121 | A1 | * | 9/2006 | Edler | .................. B23B 27/1611 407/104 |

(Continued)

FOREIGN PATENT DOCUMENTS

| CH | 686935 A5 | 8/1996 |
| CN | 202461574 U | 10/2012 |

*Primary Examiner* — Ryan Rufo
(74) *Attorney, Agent, or Firm* — Corinne R. Gorski

(57) ABSTRACT

An indexable cutting insert for milling of a root between two cogs of a cog wheel includes a top surface forming a chip surface, a bottom surface, a side surface forming a clearance surface, a first and a second curved cutting edge formed at an intersection between the top surface and the side surface for milling of the root between the two cogs. The bottom surface includes a first planar abutment section and a second planar abutment section. A first groove extends in the first abutment section and a second groove extends in the second abutment section, each along an axis parallel to a virtual line connecting the apexes of the first and second cutting edges. A first and a second stop section extend across the virtual line, wherein the first stop section protrudes above the first abutment section and the second stop section protrudes above the second abutment section.

13 Claims, 8 Drawing Sheets

(56) References Cited

U.S. PATENT DOCUMENTS

| | | | |
|---|---|---|---|
| 2010/0150670 A1* | 6/2010 | Hecht | B23C 5/109 407/40 |
| 2012/0257935 A1* | 10/2012 | Sture | B23F 21/166 407/51 |
| 2013/0294851 A1 | 11/2013 | Saagstroem | |
| 2014/0010606 A1* | 1/2014 | Sagstrom | B23C 5/08 407/51 |
| 2014/0010607 A1 | 1/2014 | Wandebaeck et al. | |

* cited by examiner

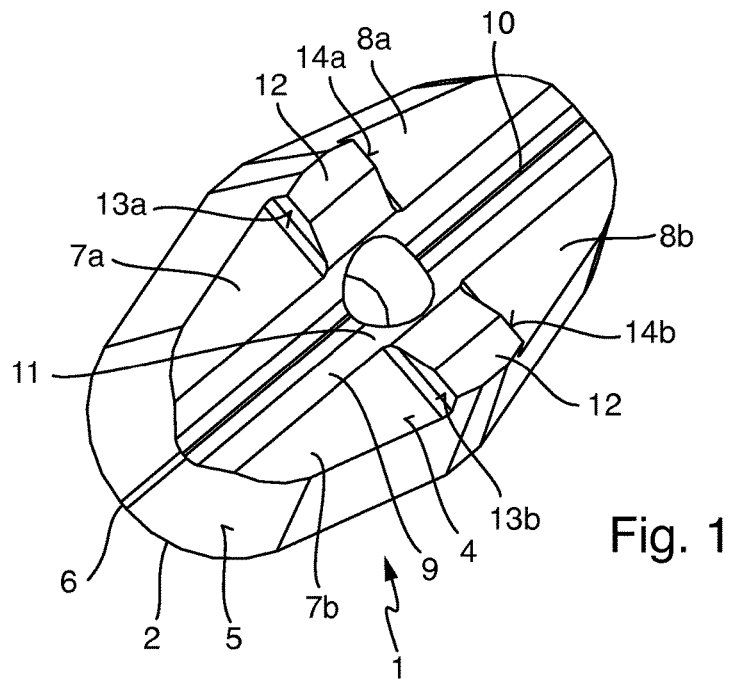
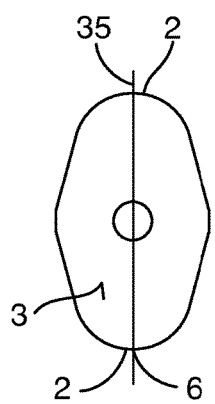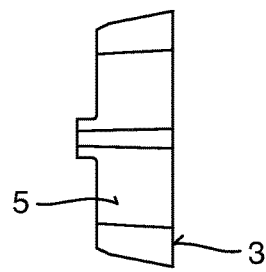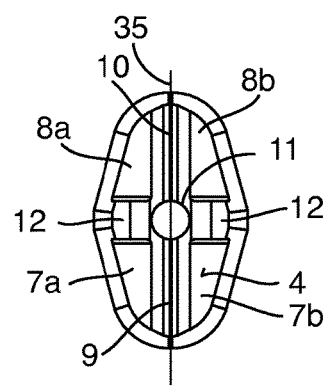
Fig. 2  Fig. 3  Fig. 5
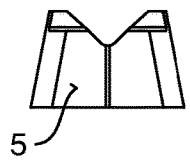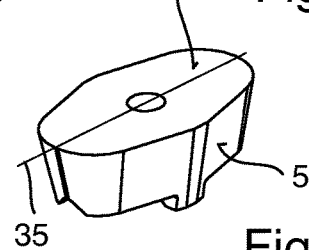
Fig. 4  Fig. 6

CUTTING INSERT AND MILLING TOOL

RELATED APPLICATION DATA

This application claims priority under 35 U.S.C. § 119 to EP Patent Application No. 14183763.3, filed on Sep. 5, 2014, which the entirety thereof is incorporated herein by reference.

TECHNICAL FIELD

The present disclosure relates to an indexable cutting insert for milling of a root between two cogs of a cog wheel including a top surface forming a chip surface, a bottom surface, a side surface connecting the top and bottom surfaces and forming a clearance surface, a first curved cutting edge and a second curved cutting edge formed at an intersection between the top surface and the side surface for milling of the root between the two cogs, wherein each of the cutting edges has an apex, and wherein the cutting insert has a two-fold rotational symmetry.

The present disclosure further relates to a milling tool for milling of a cog wheel including a tool body having axis of rotation, and a plurality of first insert seats arranged and located at the tool body to mount indexable cutting inserts for milling of a root between two adjacent cogs of the cog wheel.

BACKGROUND

Milling of cog wheels or gear wheels is well known from the prior art and numerous tools have been provided for this purpose in the past.

Milling tools for manufacturing of cog wheels can in general be categorized into two classes, namely hobs and disk mills. Each class contains multiple types of tools. Both classes of tools require that cutting edges are provided, which cut the flanks of each individual cog of the cog wheel to be manufactured as well as the root between two adjacent cogs of the cog wheel.

However, all milling tools for milling of cog wheels show an increased wear of those cutting edges involved with cutting of the root between two adjacent cogs of the cog wheel when compared to those cutting edges cutting the flanks of each individual cog.

Even if the milling is provided by individual cutting inserts, this uneven wear requires a more frequent exchange of those cutting inserts involved in the milling of the root when compared to those inserts involved with cutting of the flanks.

Furthermore, the milling tools, as well as indexable cutting inserts from the prior art, do not provide the required quality of the flanks of the cogs manufactured.

SUMMARY

The indexable cutting insert of the present disclosure, as well as a milling tool body for mounting such an indexable cutting insert, allow for a more even wear of the cutting edges involved in milling. Furthermore, a milling tool body, as well as an indexable cutting insert, allows a milling of cogs of a cog wheel having a desired precision. The milling tool body of the present disclosure is provided with an insert seat allowing a simplified manufacturing.

The above is solved by an indexable cutting insert for milling of a root between two cogs of a cog wheel including a top surface forming a chip surface, a bottom surface, a side surface connecting the top and bottom surfaces and forming a clearance surface, a first curved cutting edge and a second curved cutting edge formed at an intersection between the top surface and the side surface for milling of the root between the two cogs, wherein each of the cutting edges has an apex, wherein the cutting insert has a two-fold rotational symmetry, and wherein the bottom surface further includes a first planar abutment section and a second planar abutment section, a first groove extending in the first abutment section along an axis being parallel to a virtual line connecting the apexes of the first and second cutting edges, a second groove extending in the second abutment section along an axis being parallel to a virtual line connecting the apexes of the first and second cutting edges, a first stop section extending across the virtual line connecting the apexes, and a second stop section extending across the virtual line connecting the apexes, wherein the first stop section protrudes above the first abutment section, and wherein the second stop section protrudes above the second abutment section.

An indexable cutting insert according to the present disclosure is highly specialized for the milling of a root between two cogs of the cog wheel to be manufactured. Thus, the shape of the curved first and second cutting edges defines the shape of the root between the two cogs to be manufactured.

This type of indexable cutting insert in the present disclosure is also denoted as the first cutting insert.

The cutting insert being indexable means that once in the machining process the first cutting edge is worn, the cutting insert can be dismounted from the milling tool, turned around and the second cutting edge is then used to engage the work piece, i.e. to machine the cog wheel. This allows to double the endurance of the cutting insert.

In order to allow the cutting insert to be indexable, the cutting insert has a two-fold rotational symmetry such that it not only cuts an identical profile after having been turned around at the milling tool, but also allows for an efficient and precise clamping in both mounting positions.

The indexable cutting insert according to the present disclosure is to be mounted in a radial position, i.e. its top surface during operation forms the chip surface and the top surface when mounted may form an acute angle with a radius vector of the tool or may be parallel to a radius vector of the tool. Consequently, the side surface connecting the top and bottom surface of the insert forms a clearance surface when the insert is in engagement with the work piece.

The first and/or second planar abutment sections form a support of the mounted cutting insert in a tangential direction, i.e. tangential forces acting on the cutting insert when in operation are predominantly transferred from the planar abutment sections to the respective surfaces of a corresponding insert seat.

In contrast, the first and second stop sections extending across the virtual line connecting the apexes of the cutting edges and protruding above the first and second abutment sections predominantly account for all forces pointing in a radial direction, i.e. towards the axis of rotation of the milling tool during operation.

The described structuring of the bottom surface of the indexable cutting insert allows for a mounting, wherein only three surfaces, i.e. one of the abutment sections, one of the stop sections and the groove in the other abutment section, get in touch with corresponding or complementary surfaces of an embodiment of an insert seat. This enhances the precision of the positioning of the cutting insert on an insert seat.

It is an aspect of an indexable cutting insert according to the present disclosure that an embodiment of the corresponding insert seat to accommodate the insert can be manufactured easily even if the space next to or above the seat surfaces is limited.

When denoting the angle formed between two surfaces in the present disclosure the angle is always measured as the angle in the material forming the two surfaces.

According to an embodiment of the present disclosure, the first abutment section and the first stop section, as well as the second abutment section and the second stop section, respectively form an angle of 270° or less.

In a particular embodiment the first abutment section and the first stop section are thus perpendicular to each other as are the second abutment section and the second stop section. This embodiment is easy to manufacture.

However an angle between the abutment sections and their respective stop sections being smaller than 270° allows line contacts between the abutment section of the insert and a complementary abutment surface of an insert seat, as well as between the stop section of the insert and the complementary stop surface of the seat. This in particular even holds for an insert seat, wherein the abutment surface and the stop surface are perpendicular to each other.

In an embodiment, the angle formed between the first abutment section and the first stop section is less than 270°, equal to or less than 269° 55' and larger or equal to 260°, larger or equal to 269°, and larger or equal to 269° 20'. In an embodiment, the angle formed between the second abutment section and the second stop section is less than 270°, equal to or less than 269° 55' and larger or equal to 260°, larger or equal to 269°, and larger or equal to 269° 20'. This way the dimensions of the material of the insert carrying the stop surfaces still provide the required stability while implementing the advantage described.

When looking at the bottom surface of a cutting insert according to the present disclosure the order of the surface sections from one end to the other is: first abutment section, first stop section, second stop section, second abutment section.

In an embodiment of the cutting insert according to the present disclosure, the first stop section and the second stop section are formed on two opposite sides of a protrusion protruding above the first and second abutment surfaces.

In particular, the axes defined by the first and second grooves do coincide. In an embodiment of the disclosure, a groove connecting the first and second grooves extends though the protrusion carrying the first and second abutment surfaces. Thus, the groove connecting the first and second grooves divides the protrusion into a first segment and a second segment. This groove connecting the first and second grooves in the abutment sections not only divides the protrusion into two segments, but also each of the two stop sections is divided into two surface segments.

This embodiment reduces redundancy in the positioning of the cutting insert when mounted in an insert seat according to an embodiment of a milling tool.

Furthermore this embodiment allows for an easy mounting and dismounting of the cutting insert in and from an insert seat according to an embodiment of a tool body. Due to the groove extending over the entire bottom surface, the cutting insert can be slid onto an insert seat having a protrusion extending in parallel to the groove without lifting the insert from the seat. This implies that a wedge clamping the insert on an insert seat of a tool body according to an embodiment of the disclosure may only be loosened slightly but need not be removed before mounting or dismounting the cutting insert.

In a further embodiment, the first and second abutment sections are parallel to the top surface. In this way the manufacturing of the cutting insert will be facilitated.

In an embodiment of the indexable cutting insert according to the present disclosure, the top surface and the side surface at least in the area of the curved first and second cutting edges do form an acute angle. This way the cutting insert is a positive insert, wherein a clearance is provided by the geometry of the cutting insert itself.

At least one of the above aspects is further solved by a tool body of a hob or a disc-shaped milling cutter for milling of a cog wheel including an axis of rotation, and a plurality of first insert seats arranged and located at the periphery of the tool body to mount indexable cutting inserts for milling of a root between two adjacent cogs of the cog wheel, wherein at least one of the first insert seats comprises a planar abutment surface to provide a tangential support of the cutting insert, a planar stop surface to provide a radial support of a cutting insert, and a protrusion extending in a radial direction, wherein the abutment surface and the stop surface form an angle of 90° or an acute angle, wherein a surface normal of the stop surface is parallel to or forms an acute angle with a radius vector of the tool body intersecting the stop surface, wherein the protrusion protrudes above the abutment surface, and wherein the stop surface extends below the abutment surface.

A first insert seat can be manufactured efficiently even at a tool body having a high number of insert seats as manufacturing does not require any undue space.

In the present disclosure, the term tangential with respect to the tool body denotes a direction essentially perpendicular to a radius vector of the tool body pointing away from the axis of rotation. Correspondingly, a radial direction in this sense is a direction parallel to a radius vector of the tool body.

By this shaping, the first insert seat well corresponds to the design of the bottom surface of an indexable cutting insert as described above.

According to the present disclosure, the abutment surface and first stop surface of the first insert seat form an angle of 90° or an acute angle. In a particular embodiment, the abutment surface and the stop surface are thus perpendicular to each other. This embodiment is also easy to manufacture.

However an angle between the abutment surface and the stop surface being smaller than 90° and larger than 0°, i.e. an acute angle, allows lire contacts between the abutment surface of the insert seat and its complementary abutment section at the cutting insert as well as between the stop surface of the seat and the complementary stop section of the insert. This in particular even holds for an insert, wherein the abutment sections and their respective stop sections are perpendicular to each other.

In an embodiment the angle formed between the abutment surface and the stop surface of the insert seat is less than 90°, equal to or less than 89° 55', larger or equal to 80°, larger or equal to 89°, and larger or equal to 89° 20'. This way stability of the insert seat is provided while implementing the advantage described above.

In an embodiment of the disclosure when viewed in a radial direction, the abutment surface is located closest to the axis of rotation followed by the stop surface and the protrusion.

In a particular embodiment, the protrusion above the abutment surface is an elongated protrusion whose major direction of elongation is perpendicular to the stop surface.

The tool body for milling of a cog wheel according to the present disclosure is part of a hob or a disk-shaped milling cutter. While a hob in general has a spirally-shaped outer contour, a disk milling cutter is disk-shaped.

In an embodiment of the disclosure, the abutment surface and the stop surface do not form a common edge, but a further step is formed between the abutment surface and the stop surface. This in combination with a cutting insert according to the present disclosure, allows the cutting insert and the insert seat to be arranged such that the insert can be mounted on the insert seat such that its abutment section is slightly tilted with respect to the abutment surface of the insert seat in order to establish a line contact between the abutment section of the insert and the corresponding abutment surface of the seat.

In a further embodiment, a slidably mounted wedge is provided at the first insert seat for clamping of a cutting insert on the first insert seat.

There may be embodiments, wherein a tool body according to the present disclosure is provided with a plurality of the first insert seats only, i.e. with only one type of insert seats.

However, there is an embodiment of the present disclosure, wherein the tool body further includes a plurality of second insert seats being arranged and located at the tool body to tangentially mount a plurality of second cutting inserts for milling of the flanks of the two adjacent cogs of the cog wheel.

In a particular embodiment, the protrusion extends from a surface located below the abutment surface up to a level above the abutment surface. In this way, a cutting insert according to the present disclosure in an embodiment will only be in engagement with the insert seat with one of its abutment sections. This reduces the number of surfaces of the insert seat which may come into engagement with the surface sections of an embodiment of the cutting insert enhancing the precision of positioning the insert.

In an embodiment, the second insert seat includes a threaded hole in order to screw mount a cutting insert having a central hole for a screw.

In an embodiment of the present disclosure, the second insert seats are arranged and located at the tool body to mount cutting inserts arranged to cut the flank of one of the two adjacent cogs of a cog wheel and only a part of the root between the two cogs.

In an embodiment of the present disclosure, the number of the first insert seats equals the number of the second insert seats per pitch of the tool. For a tool body of a disk milling cutter this means that the number of the first insert seats and the number of the second insert seats are equal when counted all over the tool. For a tool body of a hob having a spirally-shaped arrangement of cutting inserts, the number of insert seats is counted per pitch of the tool body. For the second insert seats, all insert seats on both sides when viewed from first seats, i.e. to the right and to the left of the first insert seats, are counted.

By this arrangement of an equal number of first and second insert seats per pitch of the tool body and assuming that the first insert seats are equipped with indexable cutting inserts according to the present disclosure and that the second insert seats are equipped with cuttings inserts arranged to cut the flank of one of the two adjacent cogs of a cog wheel and only a part of the root between the two cogs a more equal wear of the cutting edges at the two different types of inserts is to be expected.

At least one of the above objects is also solved by a milling tool including a tool body having a plurality of insert seats and a plurality of cutting inserts according to an embodiment of the present disclosure as they have been described before in the present application, wherein the cutting inserts are radially mounted in the insert seats.

In particular, at least one of the above objects is also solved by a milling tool including a tool body according to an embodiment of the present disclosure as it has been described before and a plurality of first cutting inserts according to an embodiment of the present disclosure as they have been described before, wherein the first cutting inserts are mounted on the first insert seats, and a plurality of second cutting inserts being mounted on a plurality of second insert seats, wherein each of the second cutting inserts is located on the milling tool and arranged to mill a flank of one cog of the cog wheel.

While in such a combination the first cutting inserts are radially mounted on the first insert seats, the second cutting inserts are tangentially mounted on the second insert seats.

In a particular embodiment, the first cutting inserts are arranged and mounted on the first insert seats such that the first cutting inserts mill the root between two adjacent cogs of the cog wheel only.

In another embodiment, each of the first cutting inserts is located at the tool body and is arranged to mill the root between two adjacent cogs of the cog wheel only, wherein at least one of the second cutting inserts is located on the tool body and arranged to mill the flank of one cog of the cog wheel and in addition only a part of the root between the two adjacent cogs. In an embodiment each of the second cutting inserts is located on the tool body and arranged to mill the flank of one cog of the cog wheel and in addition only a part of the root between the two adjacent cogs.

By this arrangement of the first and second insert seats at the tool body a more equal wear of the cutting edges at the two different types of inserts is to be expected.

Furthermore, in such an embodiment, at least one, but preferably each of the second cutting inserts is located on the tool body and arranged to mill the flank of one cog of the cog wheel and only half the root between the two adjacent cogs. This way, identical second cutting edges can be used to the right and to the left of the first cutting insert while together providing for the milling of the entire root between two cogs.

Considering an arrangement with minimum number of two second insert seats with two second cutting inserts according to such an embodiment and one first insert seat with one first cutting insert, the root between the two adjacent cogs will be cut by two complete cutting edges, i.e. the full cutting edge of the first insert seat and a cutting edge of each of the two second cutting inserts, each cutting halve the root. At the same time, each of the flanks will be cut by one cutting edge of the second cutting inserts only.

Assuming that wear of the cutting edge milling the root between two cogs of the cog wheel is twice the wear of a cutting edge milling the flank portion of a cog, an arrangement, wherein each first cutting insert is accompanied by two second cutting inserts, one on each side of the first cutting insert will compensate for the uneven wear. One could turn around the first and second inserts or exchange them all at the same time.

In another embodiment, the first and second cutting inserts are located on the milling tool and are arranged such that the number of cutting edges cutting the root between the two adjacent cogs of the cog wheel per turn of the tool body is three times the number of cutting edges cutting the flanks of the two adjacent cogs of the cog wheel. This can be achieved if the number of first insert seats equals the overall number of second insert seats milling the root between two adjacent cogs of the cog wheel per turn of the tool body when in use.

In a further embodiment of the present disclosure, the cutting edges of the first cutting inserts and the cutting edges of the second cutting inserts are located at the tool body and are arranged such that when the tool body is rotated their envelopes only coincide at the root to be milled between two adjacent cogs of the cog wheel.

By reducing an overlap of the profiles of the active cutting edges to the root between two cogs of the cog wheel only, the surface quality of the flanks of the individual cogs of the cog wheel can be enhanced compared to situations, wherein an overlap between cutting edges of cutting inserts at the milling tool is located in the area of the flanks.

In an embodiment of the present disclosure, the cutting edges of the first cutting inserts and the cutting edges of the second cutting inserts are located at the tool body and are arranged such that when the tool body is rotated their envelopes do not coincide or do only coincide over a very small distance at the root between two adjacent cogs to be milled. This way the flanks of the two adjacent cogs are milled by the second cutting inserts only and the root between the two adjacent cogs is milled by the first cutting insert only. In such an embodiment, it may be advantageous once the number of first cutting inserts is twice the overall number of second cutting inserts per turn of the milling tool when in use.

In an embodiment of the combination of a milling tool having a first insert seat as described above and a first cutting insert being mounted on the first insert seat, the first cutting insert is in contact with the insert seat in three distinct areas only. One of the two abutment sections in the bottom surface of the cutting is located on the abutment surface of the insert seat. One of the two stop sections of the cutting insert is in engagement with the stop surface of the insert seat. The protrusion of the insert seat engages the groove on the other abutment section not being in engagement with the abutment surface of the insert seat.

In an embodiment of the present disclosure, the two abutment sections of the first cutting insert are divided into two segments each by the first and second groove, respectively and the protrusion carrying the stop section divided is into two segments a redundancy in the positioning of the first cutting insert on the first insert seat is avoided. Thus, positioning of the cutting insert on the first insert seat is highly precise and reproducible.

In a particular embodiment of a combination of a first cutting insert and a milling tool having a first insert seat only one of the abutment sections and one of the stop sections of the first cutting insert is in engagement with the first insert seat at a time. The cutting insert, as well as the insert seat, are designed to fulfil this requirement.

In a further embodiment of the milling tool at least one, but preferably all of the first insert seats are designed such that the abutment surface and the stop surface form an angle of less than 90°, while the first abutment section and the first stop section of the first cutting inserts are perpendicular to each other, as well as the second abutment section and the second stop section of the cutting insert being perpendicular to each other. At the same time, the insert seat and the insert are arranged such that the abutment section of the insert in engagement with the abutment surface of the seat is slightly tilted with respect to each other. This way a line contact is established between the abutment surface of the seat and one of the abutment sections of the insert as well as between the stop surface of the seat and one of the stop sections of the insert. Thus, the precision and reproducibility of the positioning of the insert on the seat is enhanced.

The effect of a slight tilting of the abutment section of the insert in engagement with the abutment surface of the first insert seat in an embodiment is arranged by providing the grooves in the abutment sections of the insert and the protrusion at the insert seat such that the insert is supported by the protrusion of the insert seat in a range from 0.005 mm to 0.015 mm below the support of the abutment surface of the insert seat, preferably 0.01 mm below the abutment surface. This effect is emphasized in an embodiment where there is a further step between the abutment surface and the stop surface of the first insert seat.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 1 is a perspective bottom view of a first cutting insert according to an embodiment of the present disclosure.

FIG. 2 is a top view of the cutting insert of FIG. 1.

FIG. 3 is a side view along the long side of the cutting insert of FIGS. 1 and 2.

FIG. 4 is a side view along the short side of the cutting insert of FIGS. 1-3.

FIG. 5 is a bottom view of the cutting insert of FIGS. 1-4.

FIG. 6 is a perspective top view of the cutting insert of FIGS. 1-5.

In the figures, identical elements are denoted by identical reference signs.

DETAILED DESCRIPTION

Figure 7:
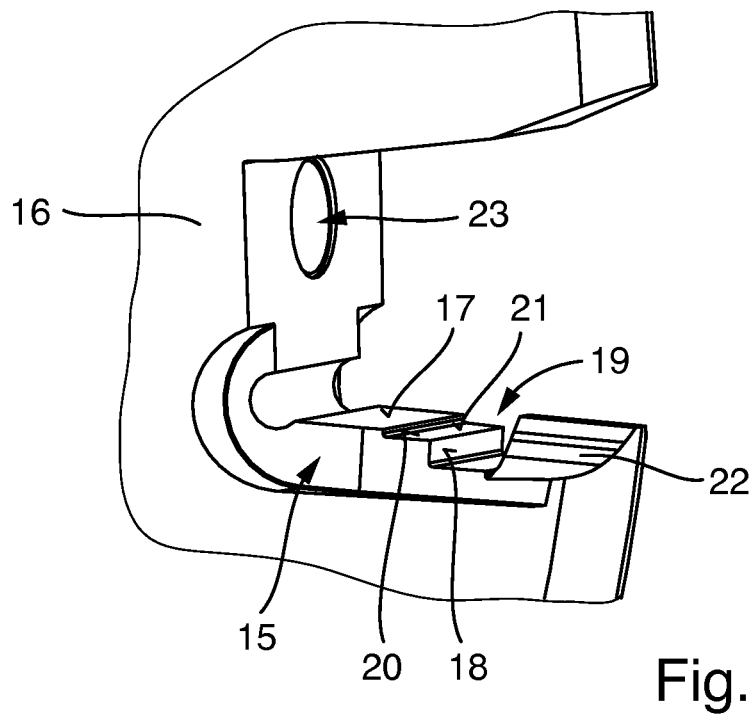
FIG. 7 is an exaggerated perspective side view of a first insert seat at a tool body of a milling tool according to the present disclosure.

The cutting insert 1 depicted in FIGS. 1 to 6 is an indexable insert having a two-fold rotational symmetry, i.e. it has two cutting edges 2, which can be used one after the other by rotating the cutting insert around its symmetry axis. The cutting insert is denoted the first cutting insert in the present disclosure.

The cutting insert 1 includes a top surface 3, a bottom surface 4 and a side surface 5 connecting the top surface 3 and the bottom surface 4. The two cutting edges 2 are provided at the intersection between the top surface 3 and the side surface 5.

The cutting edges 2 are convexly curved in order to define the concave shape of the root between two adjacent cogs of the cog wheel to be milled. Each of the cutting edges 2 has an apex 6 forming the lowest point at the root between the two adjacent cogs. As can best be seen from the side views of FIGS. 3 and 4, the cutting insert is a positive cutting insert, wherein the angle between the side surface 5 and the top surface is smaller than 90°, i.e. forms an acute angle.

This way the cutting insert can be mounted such that the top surface 3 lies on a radius vector of the tool body of the milling tool and the cutting insert provides for a sufficient clearance angle.

When mounted radially, the cutting edges 2 will cut chips from the work piece, which are guided by the top surface 3 as a chip surface of the insert.

The bottom surface 4 of the cutting insert 1 is structured or designed in order to enable a precise and highly reproducible positioning of the cutting insert 1 on a corresponding insert seat in exactly two positions allowing the cutting edges 2 to operate one after the other. In order to do so, the bottom surface 4 includes a first planar abutment section 7a, 7b and a second planar abutment section 8a, 8b. Thus, the cutting insert 1 includes a two-fold rotational symmetry.

While the first abutment section 7a, 7b is divided into two separated segments 7a, 7b by a first groove 9, the second planar abutment section is divided by a second groove 10 into two segments 8a, 8b. The first and second grooves 9, 10 extend along an axis being parallel to a virtual line 35 connecting the two apexes 6 of the cutting edges 2.

The two abutment sections 7a, 7b, 8a, 8b are separated by a protrusion 12 protruding from the first and second abutment sections 7a, 7b, 8a, 8b and protruding above the planar abutment sections. The protrusion provides first and second stop sections 13a, 13b and 14a, 14b on opposite sides thereof. Thus, the first and second stop sections 13a, 13b and 14a, 14b protrude above the first and second abutment sections 7a, 7b, 8a, 8b, respectively.

Each of the first and second stop sections 13a, 13b, 14a, 14b extend across the virtual line 35 connecting the apexes 6 of the cutting edges 2. In this particular embodiment, the stop sections 13a, 13b, 14a, 14b are perpendicular to the virtual line 35.

The first and second grooves 9, 10 in the abutment sections 7a, 7b and 8a, 8b, respectively are further connected by a groove 11 intercepting and dividing the protrusion 12. This connecting groove 11 in the protrusion 12 also extends along an axis being parallel to the virtual line 35 connecting the two apexes 6 of the cutting edges 2.

Figure 13:
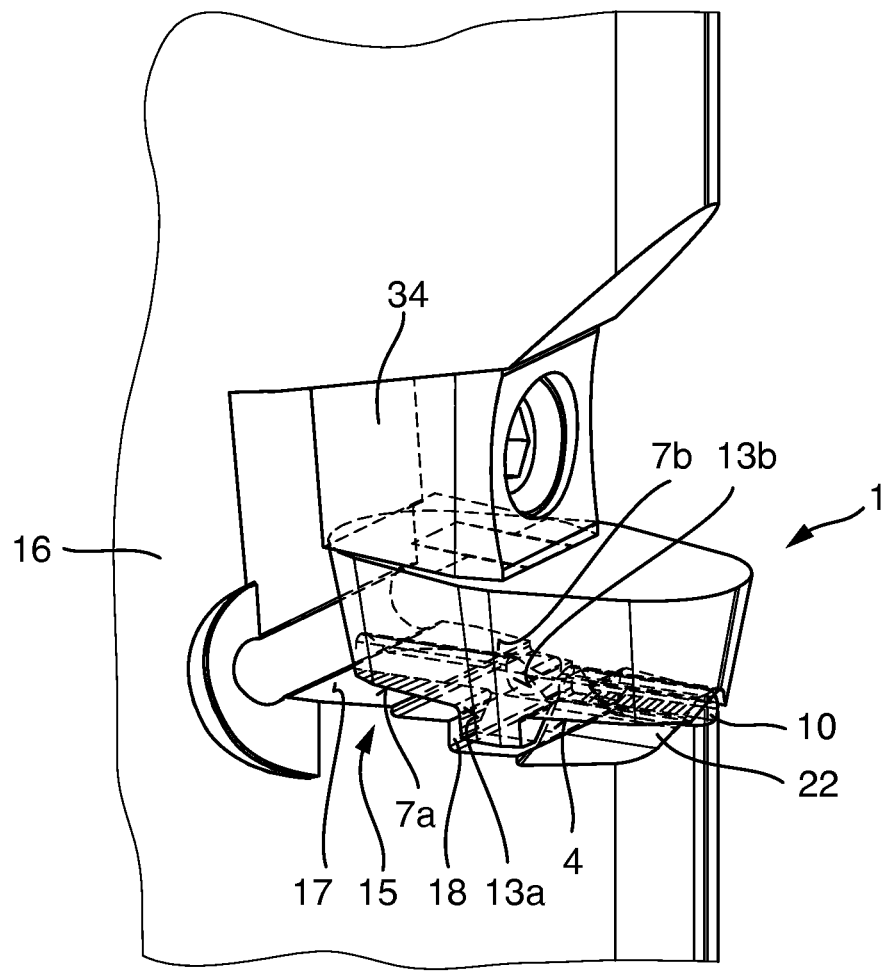
FIG. 13 is a schematic view of a combination of a cutting insert of FIGS. 1-6, but without the screw hole, and an insert seat of FIGS. 7-10 with the cutting insert drawn transparent.

As can be seen in particular from FIG. 13, this design of the bottom surface 4 of the first cutting insert 1 allows for a very accurate and highly reproducible mounting of the cutting insert 1 on a corresponding insert seat 15 reducing the risk of redundant determination of the positioning of the cutting insert 1 on the seat 15. This in particular holds as the abutment surfaces 7a, 7b, 8a, 8b as well as the stop surfaces 13a, 13b, 14a, 14b are divided into two segments each.

Furthermore, by providing the bottom surface 4 of the cutting insert 1 with a continuous groove formed by three section 9, 10, 11 the cutting insert 1 can be easily mounted on and dismounted from the insert seat 15. When mounting or dismounting the cutting insert 1 the groove 9, 10, 11 slides over the protrusion 22 of the insert seat 15. Thus, for mounting and dismounting the cutting insert 1 must not be lifted from the surfaces of the insert seat 15. This in turn means that the wedge 34 needn't be removed from the tool body, but can be loosened only slightly to release the insert 1 from the seat 15.

FIG. 13 schematically shows a transparent cutting insert 1 as depicted in FIGS. 1-6 mounted on the insert seat 15 of the cutting tool 16 as depicted in FIG. 7. Those sections of the bottom surface 4 of the cutting insert 1, which when the insert 1 is mounted on the insert seat 15, are in contact with surfaces of the insert seat 15 indicated by hatching.

A first insert seat 15 to accommodate the lower surface of the cutting insert 1 is best described with reference to FIGS. 7 and 8. The insert seat 15 is provided at the periphery of a tool body 16, 16' of a milling tool 26, 26'. The insert seat 15 is designed in order to accommodate a cutting insert as described with reference to FIGS. 1 to 6 above.

The lower surface 4 of the cutting insert 1 and the insert seat 15 are structured in order to allow a highly precise positioning of the cutting insert in two alternative directions, i.e. such that up to the choice of the operator, either of the two cutting edges 2 of the cutting insert 1 can be brought into engagement with the work piece. This positioning must also be highly reproducible, i.e. all cutting inserts showing the same structuring of the bottom surface 4 shall be positioned identical every time they are placed on the insert seat 15.

The insert seat 15 includes a planar abutment surface 17 to be brought into engagement with either of the planar abutment sections 7a, 7b, 8a, 8b of the bottom surface of the cutting insert 1 as described above. The planar abutment surface during operation of the tool provides a tangential support of a cutting insert 1 accommodated on the insert seat 15.

The insert seat 15 further includes a stop surface 18 forming an acute angle with the abutment surface 17. The stop surface 18 of the insert seat and the abutment surface 17 can be described as a tread (abutment surface) and a riser (stop surface) of a step, wherein a further smaller step 19 as described below is located between the two.

The stop surface 18 of the insert seat 15 is to be brought into contact with the stop section 13a, 13b or 14a, 14b of the lower surface 4 of the cutting insert 1 working together with the abutment section 7a, 7b, 8a, 8b of the lower surface 4 of the cutting insert 1. The stop surface 18 is oriented with respect to the axis of rotation of the tool body 16 such that the surface normal of the stop surface 18 being perpendicular to the stop surface 18 and pointing away from the surface 18 forms an acute angle with a radius vector intercepting the stop surface 18. In an alternative embodiment, the surface normal could fall together with a radius vector intercepting the stop surface 18.

The stop surface 18 during operation of the milling tool can accommodate forces acting in a radial direction on the cutting insert 1 located on the insert seat 15.

The abutment surface 17 and the stop surface 18 do not form a common edge or single step, i.e. have an extension such that they do not intercept or touch each other. Instead a further step 19 is formed between the abutment surface 17 and the stop surface 18. The further step 19 includes a first surface section 20 being perpendicular to the abutment surface 17 and being parallel to the stop surface 18 and a second surface section 21 being parallel to the abutment surface 17 and being perpendicular to the stop surface 18. The first section 20 forms an edge with the abutment surface 17, whereas the second surface section 21 forms an edge with the stop surface 19.

The insert seat 15 further includes an elongated protrusion 22 whose major elongation is in a radial direction, i.e. it extends parallel to or under an acute angle with respect to a radius vector of the tool body. The protrusion 22 is designed in order to engage into the first or second grooves 9, 10 of the cutting insert 1 when located on the insert seat 15. The protrusion 22 is further arranged to protrude above the abutment surface 17.

Assuming that the insert seat of FIG. 1 is located on the insert seat 15 such that its first abutment section 7a, 7b is in engagement with the abutment surface 17 of the insert seat 15, the second abutment section 14a, 14b will not be in engagement with the insert seat at all. Instead the side of the insert 1, where the second abutment section 8a, 8b is located is in engagement with the insert seat only with its groove 10, which accommodates the protrusion 22 of the insert seat 15.

The insert seat 15 further includes a threaded hole 23 to accommodate a screw mounting a wedge for clamping the cutting insert 1 on the insert seat 15.

In the embodiment of the milling tool described with respect to the figures, the first insert seats 15 are designed such that the abutment surface 17 and the stop surface 18 form an acute angle of slightly less than 90°, in this particular case of 89° 45', while the first abutment section 7a, 7b and the first stop section 13a,13b of the first cutting inserts 1 are perpendicular to each other as well as the second abutment section 8a, 8b and the second stop section 14a, 14b are perpendicular to each other. At the same time the insert seat 15 and the insert 1 are arranged such that the first abutment section 7a, 7b of the insert is slightly tilted with respect to the abutment surface 17 of the seat 15. This way a line contact is established between the abutment surface 17 of the seat 15 and the first abutment section 7a, 7b of the insert as well as between the stop surface 18 of the seat 15 and the first stop section 13a, 13b of the insert 1.

This slight tilt is achieved by the design and dimensioning of the complementary protrusion 22 and the groove 10 in the second abutment section 8a, 8b. The protrusion 22 supports the groove 10 in the second abutment section slightly lower than the abutment surface does support the first abutment section. The same applies once the insert is turned around. By establishing line contacts the precision and reproducibility of the positioning of the insert 1 on the seat 15 is enhanced. This effect is emphasized by the further step 19 provided between the abutment surface 17 and the stop surface 18 of the first insert seat 15.

Figure 8:
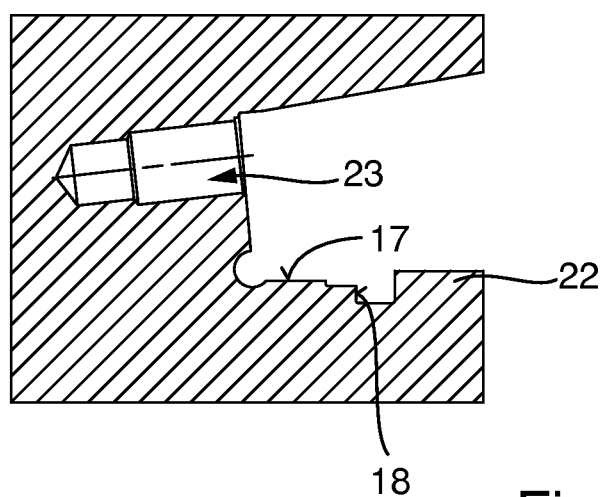
FIG. 8 is a schematic cross-sectional view of the insert seat of FIG. 7.

From the cross sectional view of FIG. 8, the positioning and orientation of the abutment surface 17, the stop surface 18 as well as the protrusion 22 is apparent. When looked at in a radial direction from the axis of rotation of the tool, i.e. in FIG. 8 from left to right, the abutment surface 17 is located closest to the axis of rotation followed by the stop surface 18 and the protrusion 22. Starting from the level of the abutment surface 17, the stop surface 18 is located below the abutment surface 17 and the protrusion 22 protrudes above the abutment surface 17. Expressed in other words, when in operation rotating around the axis of rotation of the milling tool, the uppermost bit of the protrusion 22 is the first element followed by the abutment surface 17 and the stop surface 18.

Figure 9:
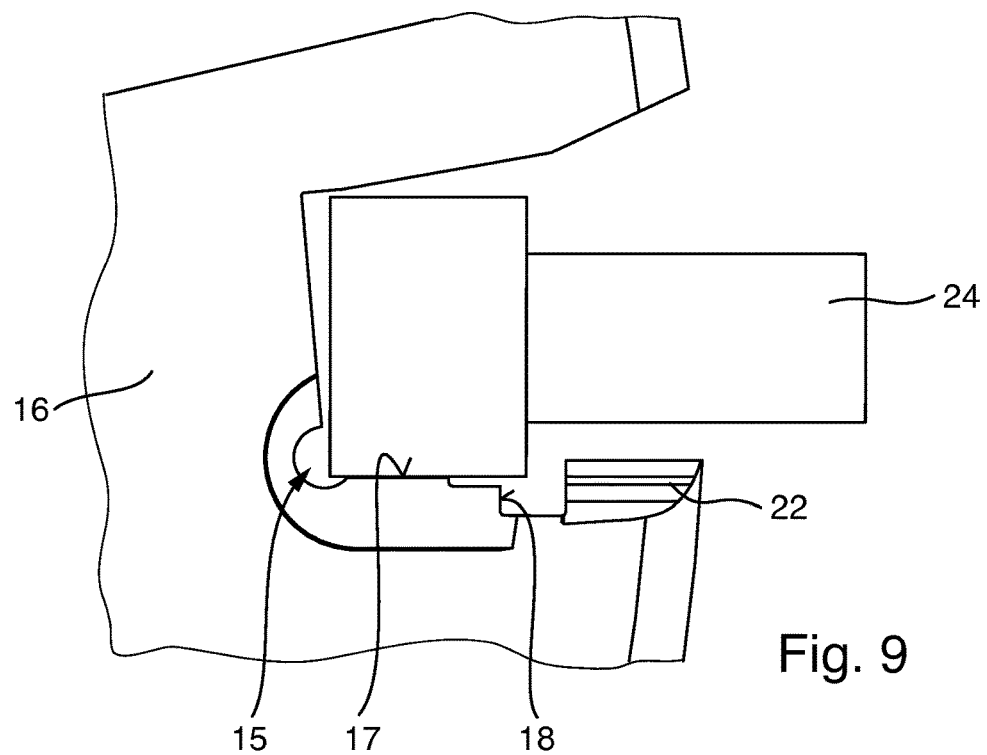
FIG. 9 is a schematic side view of an insert seat of FIGS. 7 and 8 with a tool for manufacturing the abutment surface of the insert seat inserted into the seat opening.
Figure 10:
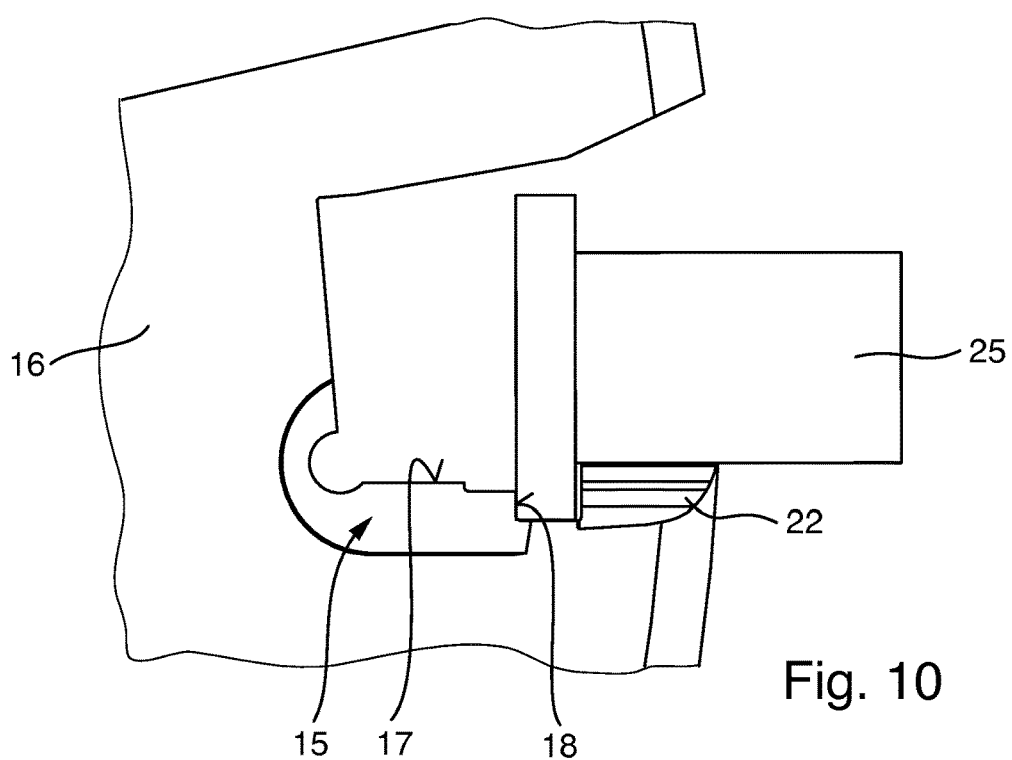
FIG. 10 is a schematic side view of the insert seat of FIGS. 7-9 with a tool inserted into the opening of the insert seat for manufacturing the stop surface of the insert seat.

FIGS. 9 and 10 schematically show the manufacturing of the abutment surface 17 (FIG. 9) as well as the stop surface 18 (FIG. 10) of the insert seat 15. FIG. 9 shows a milling tool 24 for fine milling the abutment surface 17 of the insert seat 15. In FIG. 10 a milling tool 25 has been inserted into the insert seat 15 for fine milling the stop surface 18. While not drawn to scale, it is apparent that the milling tools 24, 25 can be inserted into the opening of the insert seat 15 in a radial direction and allow a milling with high precision of the surfaces involved with the positioning of the cutting insert on the insert seat.

FIGS. 11, 12, 14 and 15 do show how a cutting insert 1 as depicted in FIGS. 1 to 7 is mounted in corresponding insert seats 15 of FIGS. 7 to 10 and 13 on the tool body 16 of a hob 26 according to present disclosure.

Figure 11:
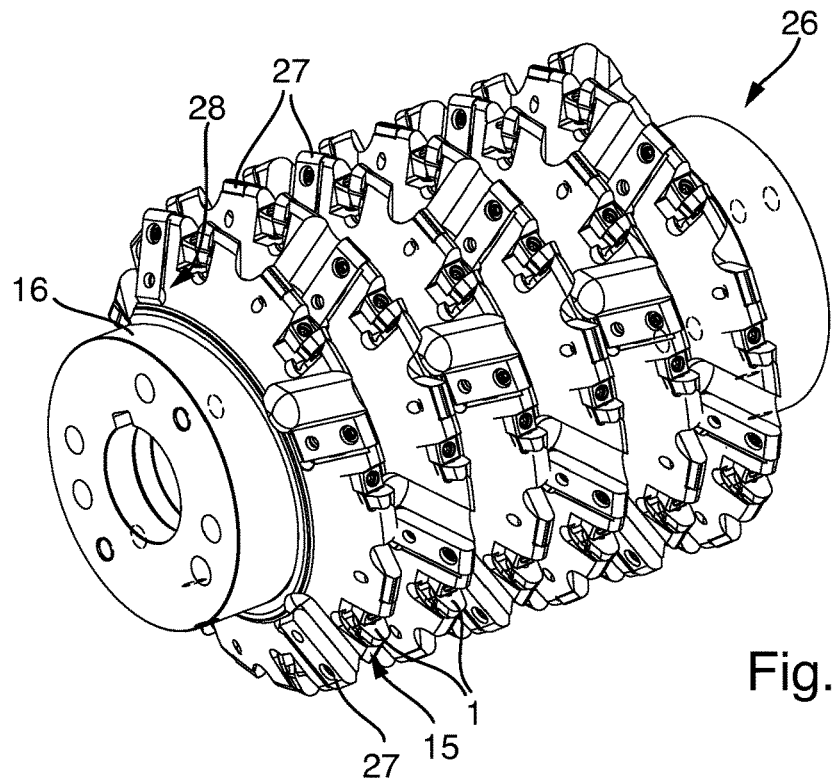
FIG. 11 is a hob with a cutting insert of FIGS. 1-6 mounted in insert seats as depicted in FIGS. 7-10.

FIG. 11 shows a perspective drawing of a hob 26 forming a milling tool in the sense of the present application, wherein a plurality of first cutting inserts 1 for milling the root between two adjacent cogs of a cog wheel are radially mounted on first insert seats 15 as shown in details in FIGS. 7 to 10 and 13. In addition to the first cutting inserts 1 for milling the root, the hob 26 carries second cutting inserts 27 for a combined milling of the flanks of the hobs as well as the root between two adjacent hobs. The cutting inserts 1 in the sense of the present application do form first inserts on the hob 26 located on first insert seats 15 located at the periphery of the tool body.

The second insert seats 27 are tangentially mounted in tangential insert seats denoted as second insert seats 28 in the sense of the present application.

The second cutting inserts 27 are negative inserts, i.e. their cutting edges 28 to 31 are formed by the edges between two surfaces forming an angle of 90°. In order to still allow for a cutting of the flanks of the cogs as well as the root between two adjacent cogs, the second inserts 27 have to be tilted in two axes with respect to the tangential direction in order to allow for an effective cutting of the work piece.

Figure 12:
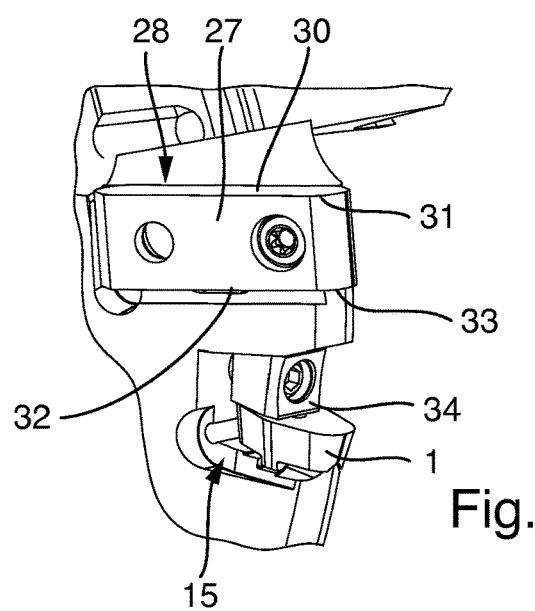
FIG. 12 is an enlarged view of a part of the hob of FIG. 11.

A mounting of the first and second cutting inserts 1, 27 in the first and second insert seats 15, 18 is shown in more detail in the enlarged view in FIG. 12. While the first inserts 1 are clamped to provide a radial cutting insert by a wedge 34, the second inserts 27 are screwed onto the second insert seats 28.

Figure 15:
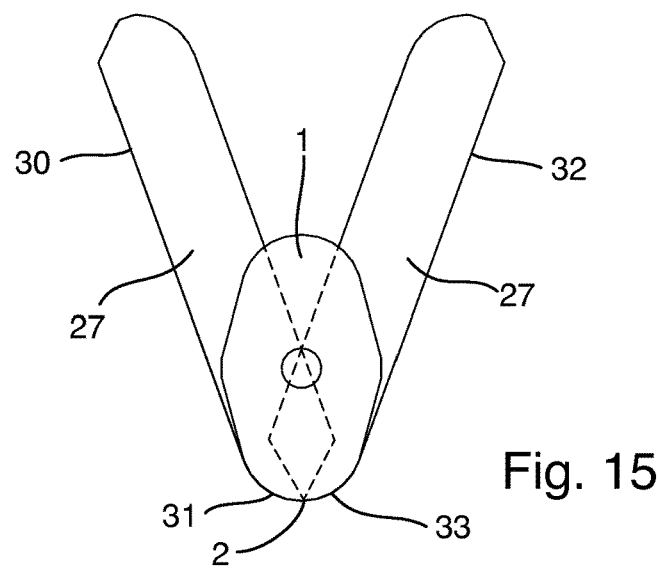
FIG. 15 is a schematic view of the profiles of the first and second cutting inserts of the hob of FIGS. 11,12 and 14 in one plane.

The geometry of the first and second cutting inserts 1, 27 and their relative locations on the tool body 16 can best be understood from the drawing of FIG. 15.

FIG. 15 shows the profiles of the first cutting insert 1, as well as two second cutting inserts 27 in a radial plane spanned by the axis of rotation, as well as a radius vector of the tool body 16. Both types of inserts 1, 27 are drawn at the point of time reaching this plane during rotation of the hob 26. The three cutting inserts 1, 27 drawn together will form the space between two adjacent cogs of the cog wheel. It is evident that the linear cutting edges 30, 32 of the second cutting inserts 27 will form the flanks of the two adjacent cogs. The cutting edge 2 of the first cutting insert 1 provides for a cutting of the root between the two adjacent cogs. This cutting however is supported by the curved cutting edges 31, 33 of the second cutting inserts 27 overlapping the cutting edge 2 of the first cutting insert 1. This overlap or coincidence of cutting edges 2, 31, 33 is provided in the area of the root in the two cogs, only, while the flanks are cut by the linear cutting edges 30, 32 of the second cutting insert 27, only.

By having the starting point of the overlap between the curved cutting edges 31, 33 of the second cutting insert 27 on the one hand and the curved cutting edge 2 of the first cutting insert 1 on the other hand in the area of the root between two adjacent cogs, the flanks of the cogs do not have any steps or other artefacts. This is important as for the precision of a cog wheel mainly the shaping of the flanks is important, while in the area of the root no engagement between two combing cogs occurs.

From FIG. 15, it is also apparent that each of the second cutting inserts 27 includes four pairs of cutting edges formed by a linear cutting edge for milling the flank of the cog and a curved cutting edge formed for milling the root between two adjacent cogs each. In order to use the four pairs of cutting edges of the second cutting inserts 27, the cutting inserts have to be swapped between seats 28 to the right and to the left of the first insert seats 15.

Figure 14:
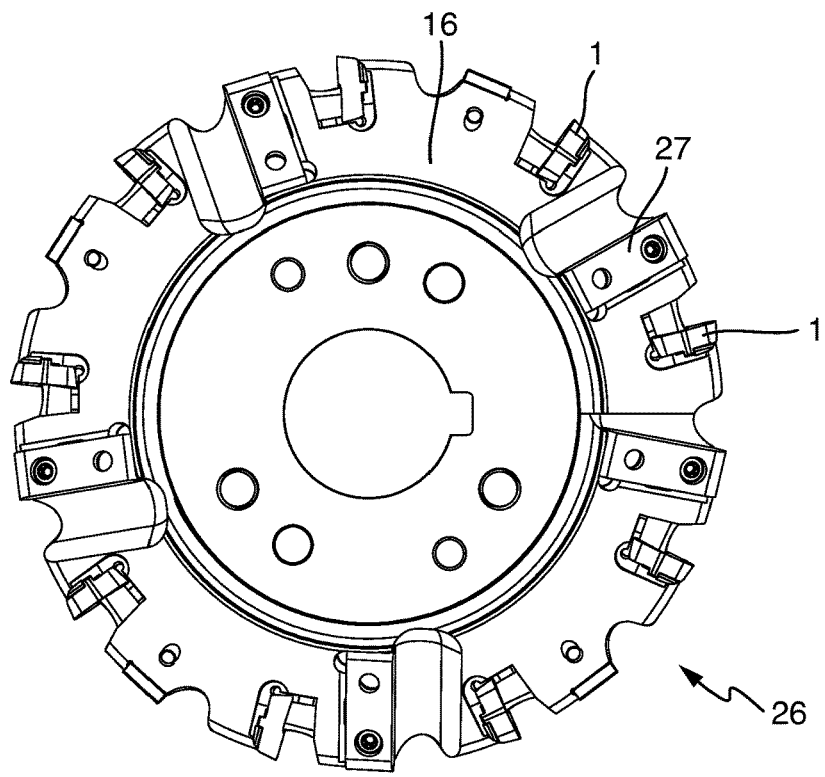
FIG. 14 is an axial side view of the hob of FIGS. 11 and 12.
Figure 16:
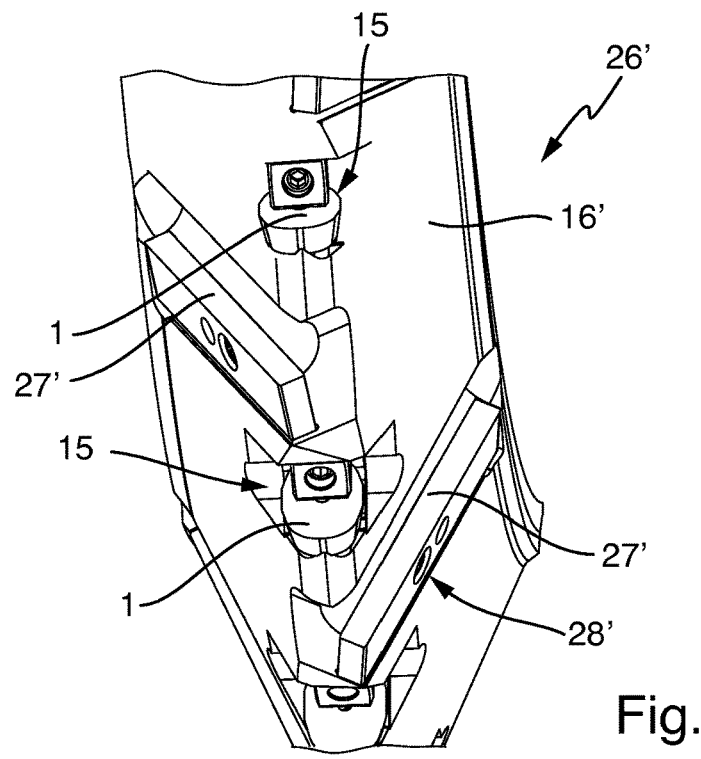
FIG. 16 is an enlarged perspective view of another embodiment of a hob according to the present disclosure.
Figure 17:
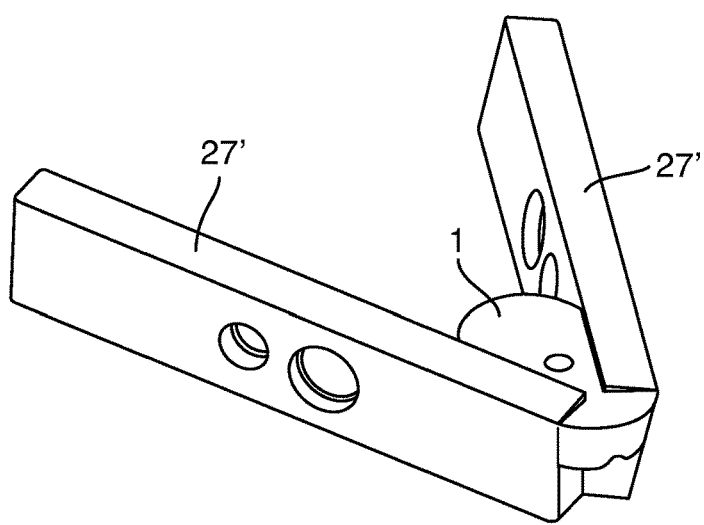
FIG. 17 is a schematic view of the profiles of the first and second cutting inserts of the hob of FIG. 16 in one plane.
Figure 18:
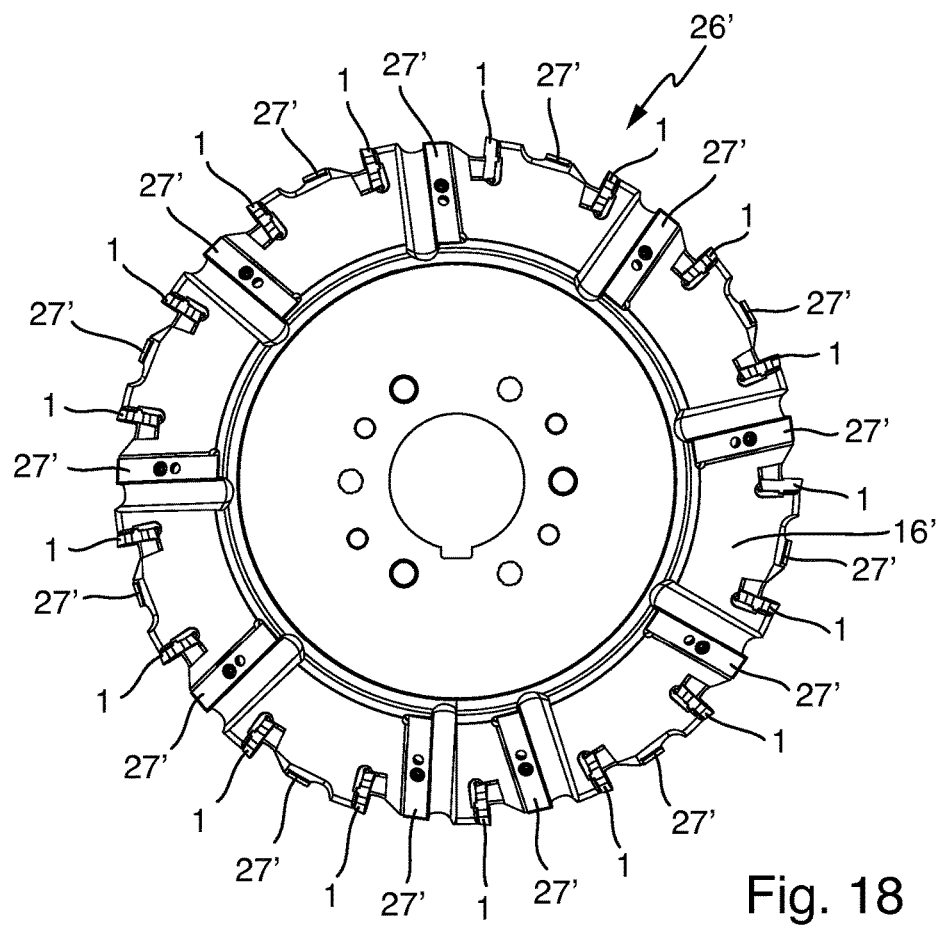
FIG. 18 is a side view of the hob of FIG. 16.

FIG. 14 shows a side view of the hob 26 of FIG. 11. This means that all cutting inserts are visible, which during one turn of the hob 26 will come in engagement with the work piece. When counting the inserts 1, 27 or seats 15, 28, it becomes apparent that during one turn of the hob 26 nine first cutting inserts 1 and a total of nine second cutting inserts 27 are in operation. As the full root is cut by two second cutting inserts 27, one on the left, one on the right, 4.5 full cuts of the root are provided by the second cutting inserts 27 per turn. In addition, the full root is cut by nine cutting edges of the first cutting inserts 1 adding up to 13.5 full cuts of the root per turn. In comparison, each flank in average is cut 4.5 times per turn of the tool body 16. Thus, the cutting output of the hob per turn is three times higher for the root than for each of the flanks accounting for the different wear of cutting edges for the root and for the flanks FIGS. 16-18 illustrate an alternative embodiment according to the present disclosure. In this embodiment, the tool body 16' of the hob 26' has been amended with respect to the design of the second insert seats 28' in order to accommodate another design of second cutting inserts 27'.

At the same time the design of the first insert seats 15, as well as the first cutting inserts 1, is the same as described with respect to FIGS. 1-15.

As before the second cutting inserts 27' mounted tangentially in second insert seats 28' are positive cutting inserts including four straight cutting edges being formed by two perpendicular surfaces of the inserts 27' each. In order to allow for efficient milling with these cutting edges the insert seats 28' provide for a tilted mounting of the cutting inserts 27'.

When compared to the second cutting inserts 27 according to the embodiment described with reference to FIGS. 1-15, the second cutting inserts 27' shown in FIGS. 16-18 lack a cutting edge provided for cutting the root between two cogs of the cog wheel. Instead the area of an overlap in between the cutting edges of the first and second cutting inserts 1 and 27', respectively, is very short such that effectively in this embodiment the root between two cogs of the cog wheel is milled by the first cutting inserts 1 only, while the flanks of the two adjacent cogs of the cog wheel are milled by the second insert seats 27' only.

Assuming as before that wear of the first cutting inserts 1 milling the root between two adjacent cogs of the cog wheel is approximately twice the wear of the second cutting inserts 27' milling the flanks of the two adjacent cogs only, the number of first insert seats 15 accommodating the first cutting inserts 1 is equal to the number of insert seats 28' carrying the second cutting inserts 27' on both sides of the first cutting inserts 1. This means that the number of first cutting inserts involved in cutting the root of two adjacent cogs of a cog wheel per turn is twice the average number of cutting inserts involved in milling each of the two flanks adjacent to the root milled by the first cutting inserts 1 per turn of the hob 26'. This is well evident from the disclosure of FIG. 18 providing a side view of the entire hob 26' of FIG. 16.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. An indexable cutting insert for milling of a root between two cogs of a cog wheel comprising:
   a top surface forming a chip surface;
   a bottom surface;
   a side surface connecting the top surface and the bottom surface and forming a clearance surface; and
   a first curved cutting edge and a second curved cutting edge formed at an intersection between the top surface and the side surface for milling of the root between two cogs of a cog wheel, wherein each of the first and second curved cutting edges has an apex, and wherein the cutting insert has a rotational symmetry such that each of the first and second curved cutting edges can be used one after the other by rotating the cutting insert around its symmetry axis, wherein the bottom surface includes a first planar abutment section and a second planar abutment section, a first groove extending in the first planar abutment section along an axis being parallel to a virtual line connecting the apexes of the first and second curved cutting edges, a second groove extending in the second planar abutment section along an axis being parallel to the virtual line connecting the apexes of the first and second curved cutting edges, a first stop section extending in a cross-wise direction relative to the virtual line connecting the apexes, and a second stop section extending in a cross-wise direction relative to the virtual line connecting the apexes, wherein the first stop section protrudes above the first planar abutment section, and wherein the second stop section protrudes above the second planar abutment section.

2. The cutting insert according to claim 1, wherein the first planar abutment section and the first stop section form an angle of 270° or less, and wherein the second planar abutment section and the second stop section form an angle of 270° or less.

3. The cutting insert according to claim 2, wherein the angle formed between the first planar abutment section and the first stop section is larger than or equal to 260°, and wherein the angle formed between the second planar abutment section and the second stop section is larger than or equal to 260°.

4. The cutting insert according to claim 1, wherein the first stop section and the second stop section are formed on opposite sides of a protrusion protruding above the first and second planar abutment sections.

5. The cutting insert according to claim 4, wherein a groove connecting the first and second grooves extends through the protrusion and divides the protrusion into a first segment and a second segment.

6. The cutting insert according to claim 1, wherein the first and second planar abutment sections are parallel to the top surface.

7. A milling tool comprising a tool body with a plurality of insert seats and a plurality of cutting inserts mounted in the insert seats, each of the plurality of cutting inserts including a top surface forming a chip surface, a bottom surface, a side surface connecting the top surface and the bottom surface and forming a clearance surface, and a first curved cutting edge and a second curved cutting edge formed at an intersection between the top surface and the side surface for milling of a root between two cogs of a cog wheel, wherein each of the first and second curved cutting edges has an apex, and wherein each of the plurality of cutting inserts has a rotational symmetry such that each of the first and second curved cutting edges can be used one after the other by rotating each of the plurality of cutting inserts around its symmetry axis, wherein the bottom surface includes a first planar abutment section and a second planar abutment section, a first groove extending in the first planar abutment section along an axis being parallel to a virtual line connecting the apexes of the first and second curved cutting edges, a second groove extending in the second planar abutment section along an axis being parallel to the virtual line connecting the apexes of the first and second curved cutting edges, a first stop section extending in a cross-wise direction relative to the virtual line connecting the apexes, and a second stop section extending in a cross-wise direction relative to the virtual line connecting the apexes, and wherein the first stop section protrudes above the first planar abutment section, and the second stop section protrudes above the second planar abutment section.

8. A milling tool comprising:
a tool body having an axis of rotation; and
a plurality of first cutting inserts arranged and located at a periphery of the tool body wherein each of the plurality of first cutting inserts includes a top surface forming a chip surface, a bottom surface, a side surface connecting the top surface and the bottom surface and forming a clearance surface, a first curved cutting edge and a second curved cutting edge formed at an intersection between the top surface and the side surface for milling of a root between two adjacent cogs of a cog wheel, wherein each of the first and second curved cutting edges has an apex, each of the plurality of first cutting inserts including a rotational symmetry such that each of the first and second curved cutting edges can be used one after the other by rotating each of the plurality of first cutting inserts around its symmetry axis, wherein the bottom surface includes a first planar abutment section and a second planar abutment section, a first groove extending in the first planar abutment section along an axis being parallel to a virtual line connecting the apexes of the first and second curved cutting edges, a second groove extending in the second planar abutment section along an axis being parallel to the virtual line connecting the apexes of the first and second curved cutting edges, a first stop section extending in a cross-wise direction relative to the virtual line connecting the apexes, and a second stop section extending in a cross-wise direction relative to the virtual line connecting the apexes, wherein the first stop section protrudes above the first planar abutment section, and wherein the second stop section protrudes above the second planar abutment section, wherein the plurality of first cutting inserts are mounted on a plurality of first insert seats to mill the root between two adjacent cogs of the cog wheel, wherein a plurality of second cutting inserts is mounted on a plurality of second insert seats, each of the plurality of second cutting inserts includes cutting edges, and wherein each of the plurality of second cutting inserts is located on the milling tool and arranged to mill a flank of one cog of the cog wheel.

9. The milling tool according to claim 8, wherein each of the plurality of first cutting inserts is located on the tool body and is arranged to mill the root between two adjacent cogs of the cog wheel only, and wherein each of the plurality of second cutting inserts is located on the tool body and arranged to mill the flank of one cog of the cog wheel and only a part of the root between two adjacent cogs.

10. The milling tool according to claim 8, wherein the plurality of first cutting inserts and the plurality of second cutting inserts are located on the milling tool and are arranged such that the number of cutting inserts contacting the root between two adjacent cogs of the cog wheel per 360° turn of the tool body is more than the number of cutting inserts contacting a given one of the flanks of two adjacent cogs of the cog wheel when in use.

11. The milling tool according to claim 8, wherein the cutting edges of the plurality of first and second curved cutting inserts and the cutting edges of the plurality of second cutting inserts are arranged such that when the tool body is rotated their envelopes do not coincide such that the flanks of two adjacent cogs are milled by the plurality of second cutting inserts only and the root between two adjacent cogs is milled by the plurality of first cutting inserts only.

12. The milling tool according to claim 11, wherein the number of first cutting inserts is twice the number of second cutting inserts coming into engagement with the work piece per 360° turn of the tool body when in use.

13. The milling tool according to claim 9, wherein each of the plurality of second cutting inserts is located on the tool body and arranged to mill the flank of one cog of the cog wheel and half of the root between two adjacent cogs.

* * * * *